US007091417B1

(12) United States Patent
Jur et al.

(10) Patent No.: US 7,091,417 B1
(45) Date of Patent: Aug. 15, 2006

(54) BUSWAY FITTING HAVING A STACKED BUS BAR WITH AN EXTRUDED SUPPORT

(75) Inventors: Arthur J. Jur, Greenwood, SC (US); Philip D. Miller, Greenwood, SC (US); Robert G. Towne, Greenwood, SC (US); Douglas V. Taylor, Greenwood, SC (US); Stephen W. Oneufer, Greenwood, SC (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/172,629

(22) Filed: Jul. 1, 2005

(51) Int. Cl.
*H02G 5/00* (2006.01)

(52) U.S. Cl. .................. 174/68.2; 174/70 B; 174/71 B; 174/149 B; 361/611

(58) Field of Classification Search .............. 174/68.2, 174/71 B, 72 B, 88 B, 99 B, 129 B, 133 B, 174/149 B, 70 B; 361/611, 624, 637, 825, 361/826
See application file for complete search history.

(56) References Cited

U.S. PATENT DOCUMENTS

| 2,261,857 | A | * | 11/1941 | Novak et al. | 174/72 B |
| 4,176,243 | A | * | 11/1979 | Kovatch et al. | 174/72 B |
| 5,821,464 | A | * | 10/1998 | Graham et al. | 174/99 B |
| 5,982,611 | A | * | 11/1999 | Campbell et al. | 174/70 B |
| 6,111,745 | A | * | 8/2000 | Wilkie et al. | 174/68.2 |
| 6,160,699 | A | * | 12/2000 | Gibson et al. | 361/825 |
| 6,169,248 | B1 | * | 1/2001 | Rowe et al. | 174/70 B |
| 6,205,019 | B1 | * | 3/2001 | Krom | 174/72 B |
| 6,435,888 | B1 | * | 8/2002 | Reed, Jr. | 174/88 B |
| 6,762,362 | B1 | * | 7/2004 | Cavanaugh et al. | 174/68.2 |
| 6,781,818 | B1 | * | 8/2004 | Josten et al. | 174/68.2 |
| 6,870,103 | B1 | * | 3/2005 | Wiant et al. | 174/68.2 |

* cited by examiner

*Primary Examiner*—Dean A. Reichard
*Assistant Examiner*—Adolfo Nino
(74) *Attorney, Agent, or Firm*—Martin J. Moran

(57) ABSTRACT

A busway fitting bus assembly for a busway fitting, wherein the busway fitting has a housing assembly defining an enclosed space, the housing assembly having a top end, a bottom end, and a sidewall, the sidewall having a side opening, at least one tap bus extending between the side opening and the enclosed space. The busway fitting bus assembly includes a plurality of elongated, main bus members, the main bus members structured to extend the length between the busway fitting housing assembly bottom end and the busway fitting housing assembly top end, and a support assembly having an extruded body structured to enclose and support the plurality of main bus members.

20 Claims, 6 Drawing Sheets

BUSWAY FITTING HAVING A STACKED BUS BAR WITH AN EXTRUDED SUPPORT

BACKGROUND OF THE INVENTION

1. Field of the Invention

The present invention relates to a busway fitting and, more specifically, to a busway fitting having a continuous busway fitting bus assembly wherein the bus bars are encased in an extruded support.

2. Background Information

A busway may be used to distribute power over an extended length, such as, but not limited to, through multiple floors of a building. The busway typically includes multiple busway sections each having a plurality of conductive members, or buses, disposed in an extruded housing. The housing, typically an aluminum extrusion, acts to support the bus members and to dissipate heat over most of the busway length. That is, the extruded housing is used to protect and support the bus members as the busway extends between floors. As the extruded housing substantially encloses the conductive members, the extruded housing does not generally allow for an additional bus, hereinafter a "tap bus," that extends beyond the busway and is coupled to a load.

A busway fitting is an enclosure disposed on the busway wherein one or more tap buses may connect to the busway. The busway fitting is, typically, an elongated housing having a busway fitting bus assembly. The busway fitting bus assembly extends through the length of the busway fitting housing and includes two exposed ends on opposite sides of the busway fitting housing. The busway fitting bus assembly is coupled to a busway section at each end. The tap buses are coupled to the busway fitting bus assembly within the busway fitting housing. The tap buses are further coupled to a load.

For example, a busway may extend vertically through a multiple floor apartment building. On each floor of the apartment building there are a number of apartments. Thus, at each floor it is convenient to have a meter center with one meter coupled to the electrical system of each apartment. Each meter center is coupled to the busway at a busway fitting. For the sake of this example only, it will be assumed that an external source of power is coupled to a first busway section at the base of the apartment building. Thus, the apartment building busway includes a first busway section that is coupled at a lower end to the power source and at the upper end to a first busway fitting, and more specifically to the first busway fitting bus assembly lower end. The first busway fitting tap bus(es) is coupled to a meter center for the first floor apartments. A second busway section lower end is coupled to the upper side of the first busway fitting, and more specifically to the first busway fitting bus assembly upper end. The second busway section upper end is coupled to a second busway fitting, and more specifically to the second busway fitting bus assembly lower end. The second busway fitting tap bus(es) is coupled to a meter center for the second floor apartments. This configuration of bus section coupled to bus fitting may be repeated for each additional floor of the apartment building.

The busway fitting bus assembly typically included multiple buses. The buses typically included multiple main bus bar assemblies that were, in turn, made from multiple shorter bus bars. The bus bar assemblies were held in a spaced relation by one or more U-shaped brackets secured by bolts. These brackets provided the bracing required to support the bus bars. The multiple bus bars were further coupled to one or more heat sinks to dissipate the heat created when a current flowed through the bus members. The tap buses were also attached to the main bus bar assemblies by fasteners. The multiple buses also included a ground bus. Given the number of mechanical connections and components, the busway fitting bus assembly required time and effort to assemble.

There is, therefore, a need for a busway fitting bus assembly that uses fewer parts.

There is a further need for a busway fitting bus assembly that eliminates the need for a ground bus bar.

There is a further need for a busway fitting bus assembly that may be used in conjunction with busways which are presently installed.

SUMMARY OF THE INVENTION

These needs, and others, are met by the present invention which provides a busway fitting bus assembly having one or more elongated, main bus bars disposed in a support assembly having an extruded body. The extruded body provides support over the length of the busway fitting housing assembly thereby allowing the main bus bars of the busway fitting bus assembly to have an extended length. That is, unlike the prior art, the main bus bars of the busway fitting bus assembly have a continuous length. Additionally, the extruded body provides a current path. As such, the extruded body may be coupled to, and in electrical communication with, the busway fitting housing assembly, thereby providing a ground path and eliminating the need for a ground bus bar. The location of the ground path may be controlled by masking the extruded body with a non-conductive material. The extruded body further includes one or more openings for tap buses. These openings, preferably, allow the tap buses to extend laterally away from the elongated bus bars. The tap buses are brazed to the main bus bars thereby eliminating the need for additional fasteners.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, directional terms, such as "vertical," "horizontal", "upper," and "lower" relate to the assembly as shown in the Figures and are not limiting upon the claims.

Figure 1:
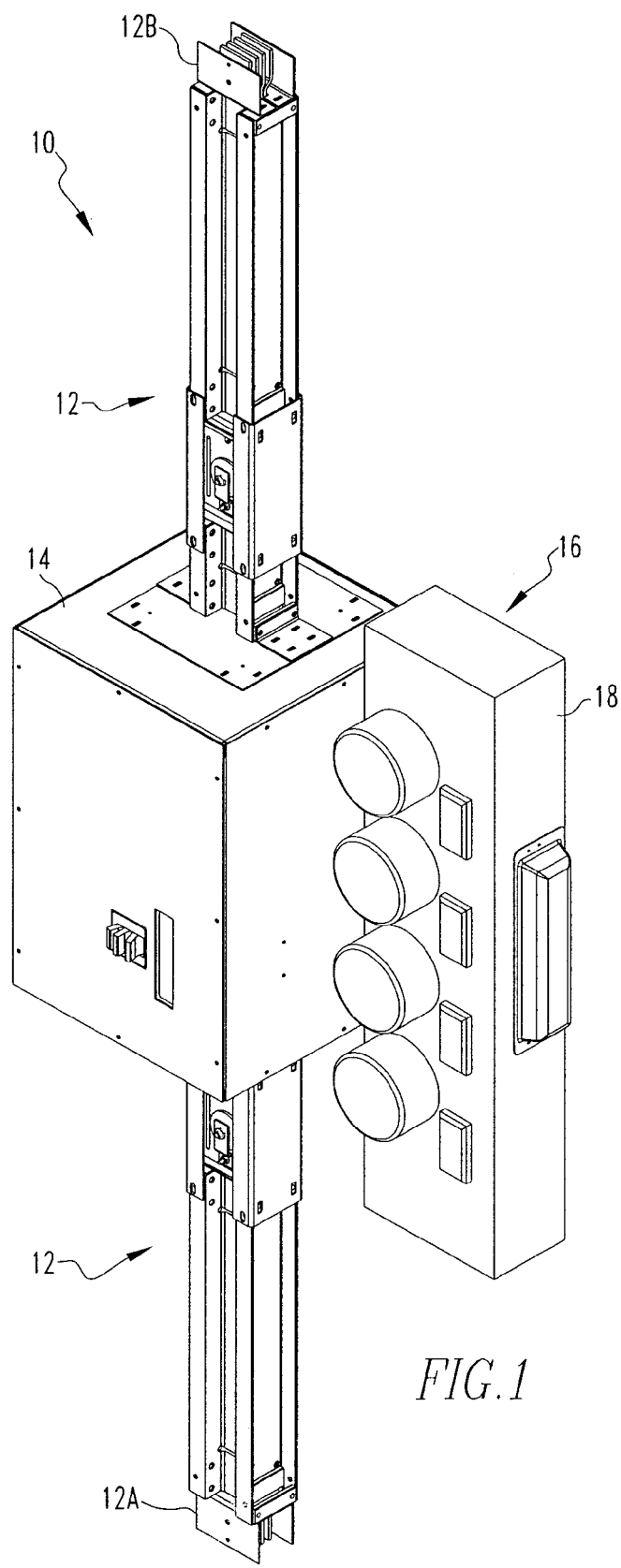
FIG. 1 is an isometric view of a portion of a busway.

As shown in FIG. 1, a busway 10 structured to distribute power over an extended length includes a plurality of busway sections 12 and one or more busway fittings 14. The busway section 12 includes a conductive bus in a protective housing as is known in the prior art. Two busway sections 12A, and 12B are shown. As shown, the busway 10 extends in a vertical direction. The lower busway section 12A is coupled to, and in electrical communication with, both a power source (not shown), such as, but not limited to an electrical network, and one busway fitting 14. The upper busway section 12B is coupled to, and in electrical communication with, two busway fittings 14, the busway fitting 14 that the lower busway section 12A is coupled to and another busway fitting (not shown). The busway 10 may include multiple busway fittings 14 separated by busway sections 12. In this configuration, the busway 10 may distribute power to multiple floors of a building. Additionally, the busway 10 may include an external device 16, such as, but not limited to a meter center 18. The meter center 18, as is known in the art, includes a plurality of female electrical connections (not shown). The meter center 18 is coupled to, via the female electrical connections, the busway fitting 14 and, more specifically, to one or more tap buses 32 (described below).

Figure 2:
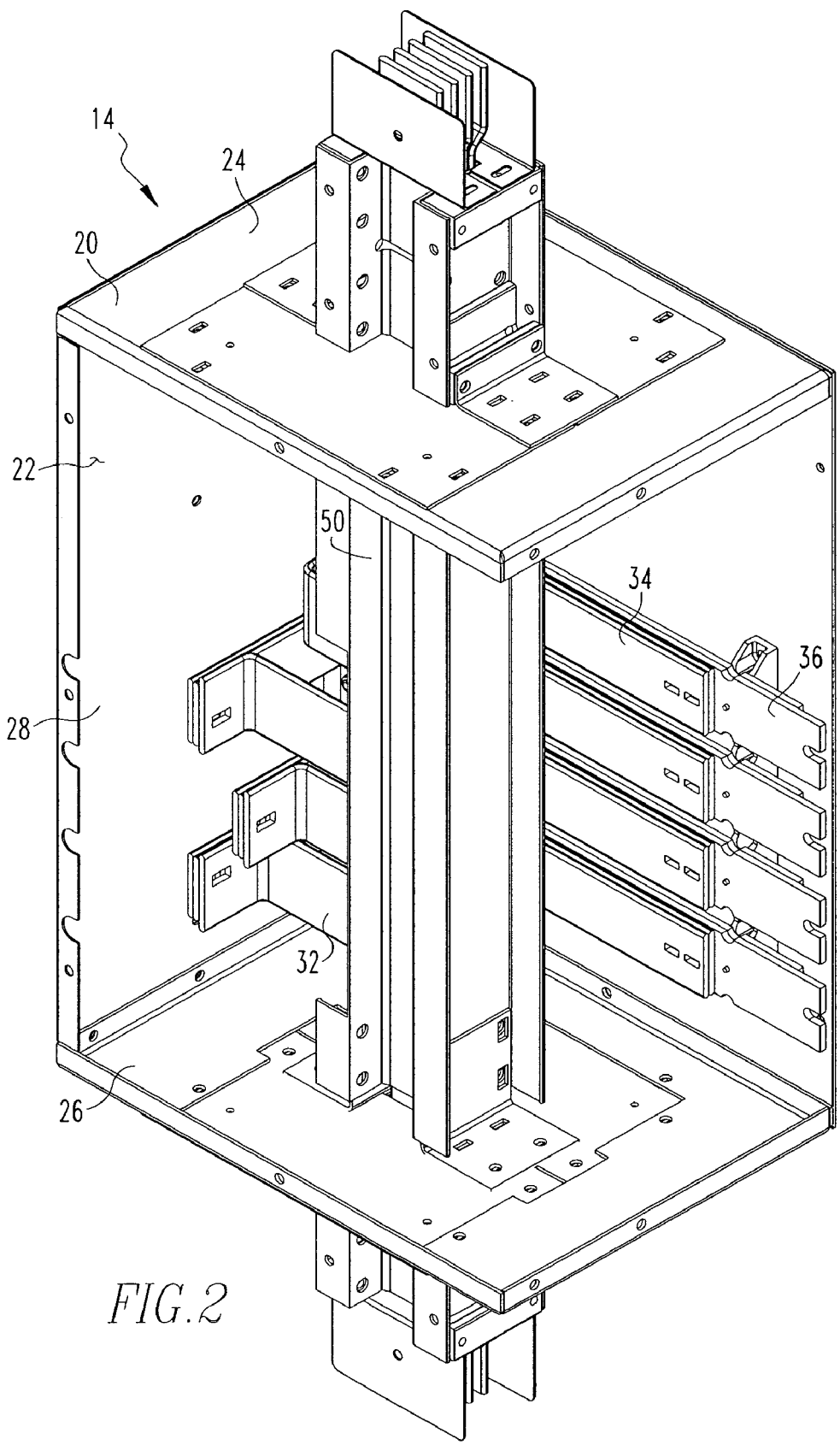
FIG. 2 is an isometric view of a busway fitting without a circuit breaker.

As shown in FIG. 2, the busway fitting 14 includes an elongated housing assembly 20 defining an enclosed space 22. The housing assembly 20 has a top end 24, a bottom end 26, and a sidewall 28. The sidewall 28 has a first side opening 30 and may have a second side opening 31 (see FIG. 3). A busway fitting bus assembly 50 extends longitudinally through the housing assembly 20. The busway fitting bus assembly 50 is discussed in greater detail below. The busway fitting 14 further includes one or more tap buses 32. Each tap bus 32 has a width of between about two inches and five inches, and more preferably about three inches. Each tap bus 32 is coupled to, and in electrical communication with, a main bus 52 (described below) in the busway fitting bus assembly 50. In the embodiment shown in FIG. 2, each tap bus 32 extends laterally from the main bus 52 to the sidewall opening 30. While each tap bus 32 may terminate in a male electrical connection, in a preferred embodiment, each tap bus 32 is coupled to a lateral extension portion 34. The lateral extension portion 34 is structured to extend laterally across said busway fitting housing assembly 20. The lateral extension portion 34 has a male electrical connection 36 extending from the first side opening 30 and a female electrical connection (not shown) disposed adjacent to the second side opening 31. The male electrical connection 36 is structured to be coupled to an external device 16, such as, but not limited to, a meter center 18.

Figure 3:
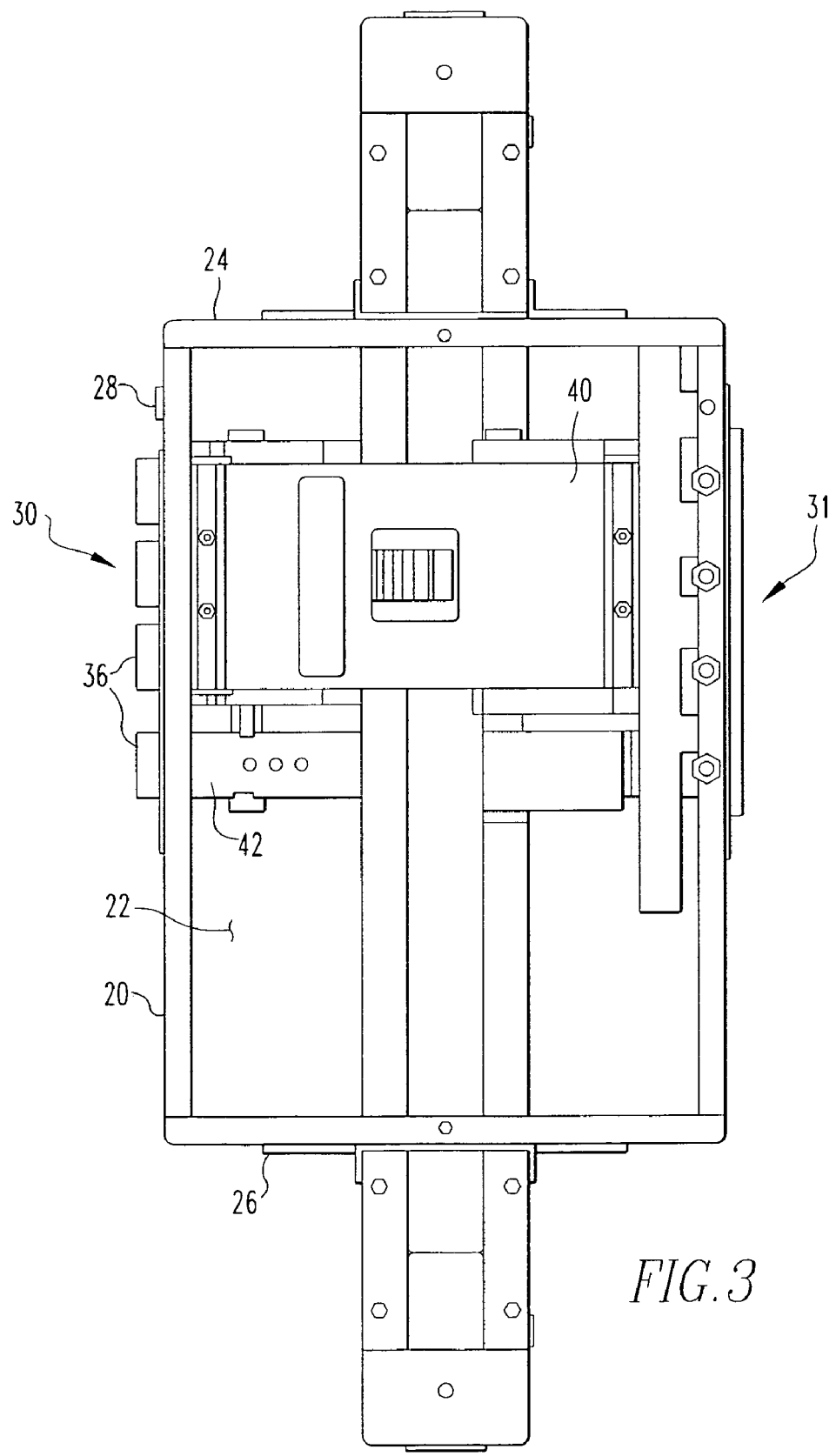
FIG. 3 is a front view of a busway fitting with a circuit breaker.

In another embodiment, shown in FIG. 3, the busway fitting 14 further includes a circuit breaker 40 and at least one load bus 42. The circuit breaker 40, as is known in the art, includes at least one pair of separable contacts (not shown) which are moveable from a coupled, closed position to a separated, open position. Each pair of separable contacts are in electrical communication with a line terminal 44 and a load terminal 46, shown in FIG. 4. In this embodiment, as before, each tap bus 32 is coupled to, and in electrical communication with, a main bus 52 (described below) in the busway fitting bus assembly 50. However, each tap bus 32 is further coupled to the circuit breaker line terminal 44. Each load bus 42 is coupled to a load terminal 46. Each load bus 42 extends to the sidewall opening 30. While each load bus 42 may terminate in a male electrical connection, in a preferred embodiment, each load bus 42 is coupled to a lateral extension portion 34A. The lateral extension portion 34A is structured to extend laterally across said busway fitting housing assembly 20. The lateral extension portion 34A has a male electrical connection 36A extending from the first side opening 30 and a female electrical connection 38A disposed adjacent to the second side opening 31. The male electrical connection 36A is structured to be coupled to an external device 16, such as, but not limited to, a meter center 18.

Figure 4:
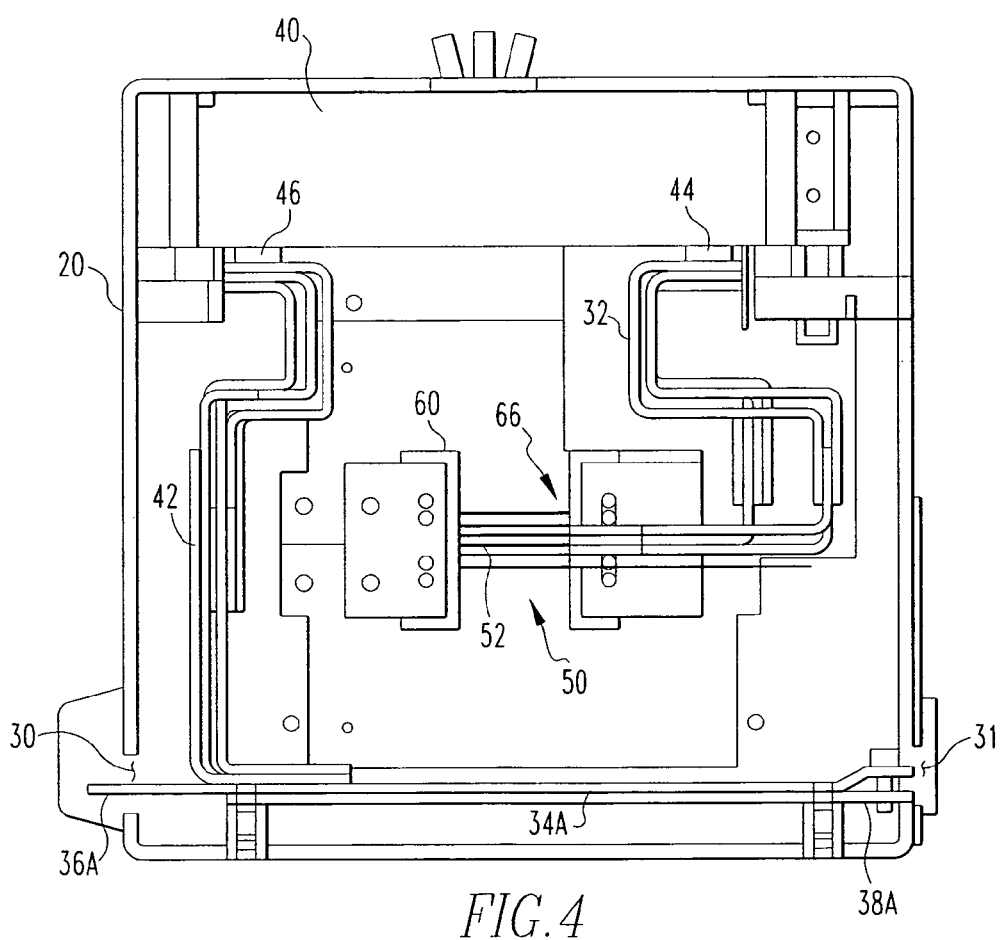
FIG. 4 is a top cross-sectional view of the busway fitting of FIG. 3.
Figure 5:
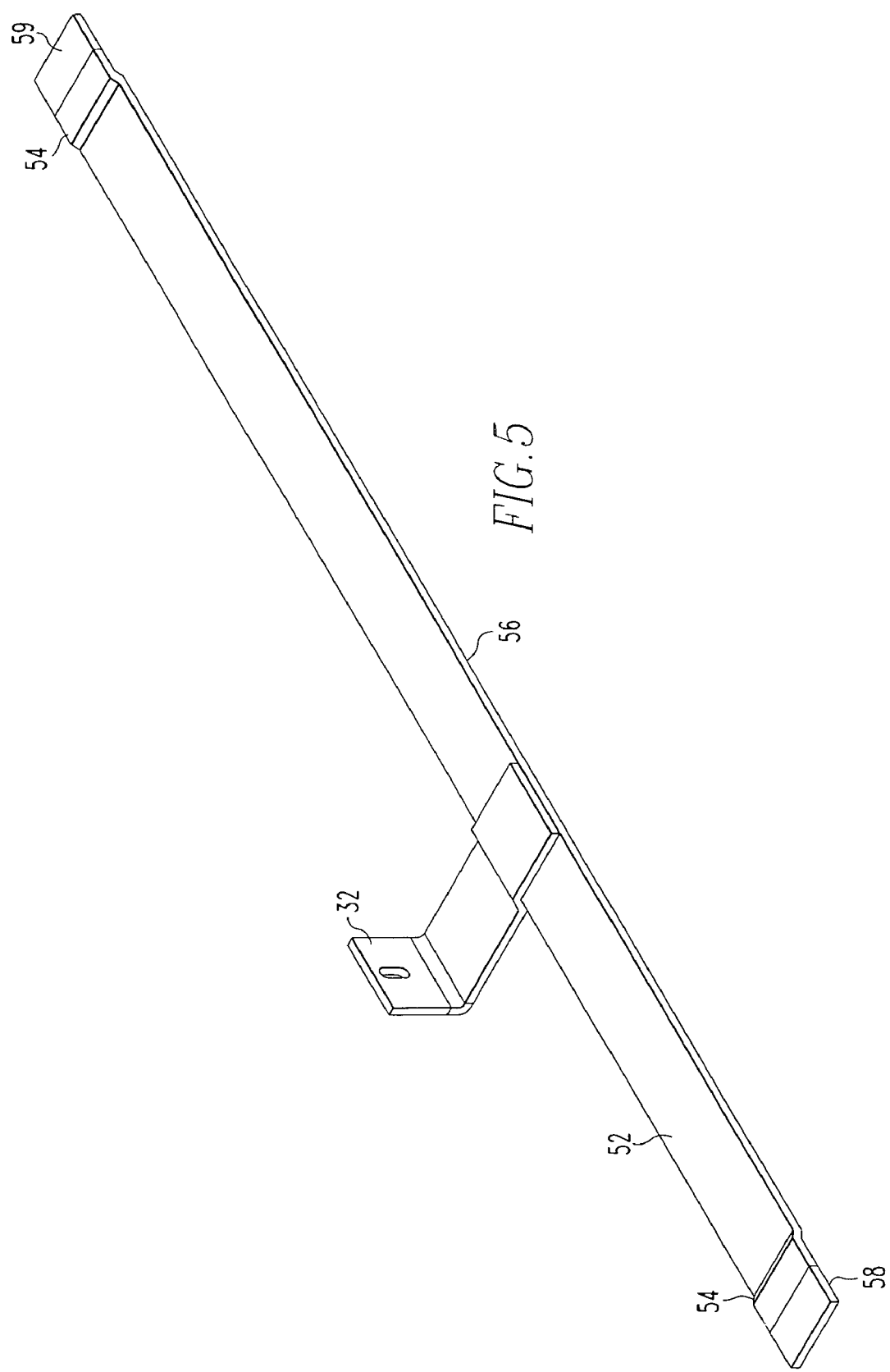
FIG. 5 is an isometric view of a main bus with a tap bus.

As shown in FIG. 4, the busway fitting bus assembly 50 includes one or more elongated, main bus 52, and a support assembly 60. Where there is more than one main bus 52, the main bus 52 is disposed in a stacked configuration. As shown in FIG. 5, the main bus 52 is constructed from a single member. The main bus 52 may have a slight offset 54 to accommodate the thickness of the tap buses 32. Each tap bus 32 is, preferably, brazed directly to an associated main bus 52. The main bus 52 has a sufficient length to extend through the busway fitting housing assembly 20 and extend beyond the top and bottom ends 24, 26 thereof. Accordingly, the main bus 52 have an internal portion 56 and a first, bottom external end 58 and a second, top external end 59. Depending upon the number of main bus 52 in the busway fitting bus assembly 50, the external ends 58, 59 may be offset to a greater degree to accommodate coupling the busway fitting bus assembly 50 to the busway sections 12A, 12B.

Figure 6:
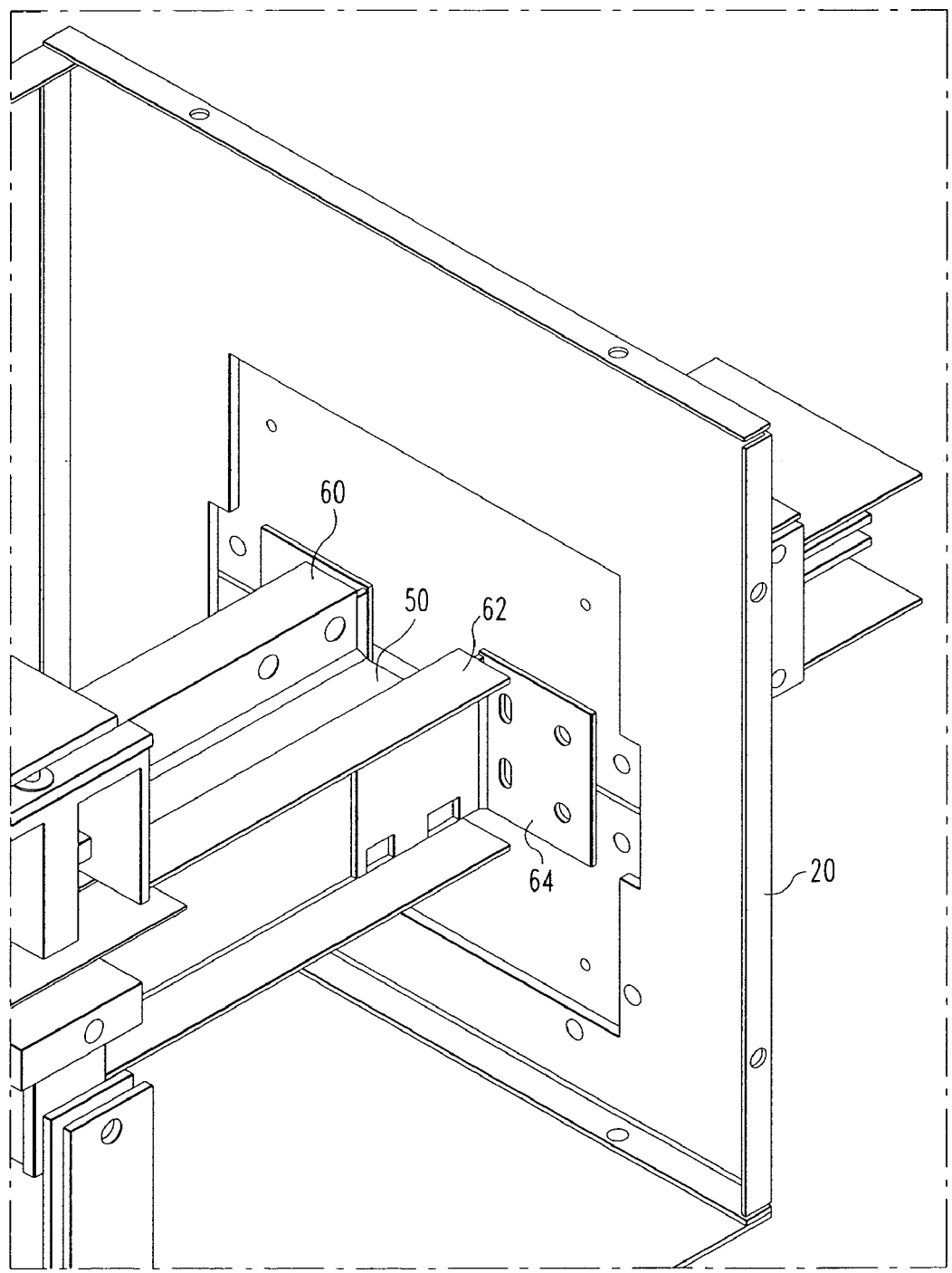
FIG. 6 is a detail isometric view of the busway fitting bus assembly in the busway fitting housing.

The support assembly 60 has an extruded body 62 structured to enclose and support the plurality of main bus members 52. The extruded body 62 is, preferably, conductive, being made from aluminum. The extruded body 62 is coupled to, and in electrical communication with, the busway fitting housing assembly 20 thereby providing a ground path and eliminating the need for a ground bus. The extruded body 62 is coupled to the busway fitting housing assembly 20 by a ground bus bracket 64, as shown in FIG. 6. The ground path may be additionally controlled by using a non-conductive masking material. As shown in FIG. 4, where there is a plurality of main bus 52 disposed in a staked relationship, the extruded body 62 extends between and separates the main bus 52. As noted above, each tap bus 32 is, preferably, brazed directly to an associated main bus 52. However, if a tap bus 32 is not brazed to a main bus 52, the extruded body 62 may include a lateral opening 66 through which a tap bus 32 may be disposed and coupled to the main bus 52.

In the preferred embodiment, as shown in the figures, the busway fitting bus assembly 50 includes four main buses 52. These four main buses 52 correspond to a three-phase system with a neutral main bus 52. Each main bus 52 has a width of between about two inches and five inches, and more preferably about two and a half inches While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A busway fitting bus assembly for a busway fitting, said busway fitting having a housing assembly defining an enclosed space, said housing assembly having a top end, a bottom end, and a sidewall, said sidewall having a side opening, at least one tap bus extending between said side opening and said enclosed space, said busway fitting bus assembly comprising:

a plurality of elongated, main bus members, said main bus members structured to extend the length between said busway fitting housing assembly bottom end and said busway fitting housing assembly top end; and a support assembly having an extruded body structured to enclose and support said plurality of main bus members, said main bus members extending beyond said extruded body in one direction.

2. The busway fitting bus assembly of claim 1 wherein said extruded body is conductive.

3. The busway fitting bus assembly of claim 2 wherein said support assembly includes a ground bus bracket, said ground bus bracket structured to be coupled to, and in electrical communication with, both said extruded body and said busway fitting housing assembly.

4. The busway fitting bus assembly of claim 2 wherein said extruded body is made from aluminum.

5. The busway fitting bus assembly of claim 1 wherein said extruded body includes at least one lateral tap bus opening, said tap bus opening aligned with said at least one tap bus so that said tap bus is coupled to, and in electrical communication with one of said plurality of main bus members.

6. The busway fitting bus assembly of claim 1 wherein said plurality of main bus members includes four bus members.

7. A busway fitting comprising:
a housing assembly defining an enclosed space, said housing assembly having a top end, a bottom end, and a sidewall, said sidewall having a side opening;
a busway fitting bus assembly coupled to said housing assembly having a plurality of elongated, main bus members and a support assembly;
said main bus members structured to extend the length between said busway fitting housing assembly bottom end and said busway fitting housing assembly top end;
a support assembly having an extruded body structured to enclose and support said plurality of main bus members, said main bus members extending beyond said extruded body in one direction; and
at least one tap bus extending between said side opening and at least one of said main bus members.

8. The busway fitting of claim 7 wherein said extruded body is conductive.

9. The busway fitting of claim 8 wherein said support assembly includes a ground bus bracket, said ground bus bracket structured to be coupled to, and in electrical communication with, both said extruded body and said busway fitting housing assembly.

10. The busway fitting of claim 8 wherein said extruded body is made from aluminum.

11. The busway fitting of claim 7 wherein said plurality of main bus members includes four bus members.

12. The busway fitting of claim 7 wherein said at least one tap bus includes a lateral extension portion structured to extend laterally across said busway fitting housing assembly, said lateral extension portion having a male end and a female end.

13. A busway fitting comprising:
a housing assembly defining an enclosed space, said housing assembly having a top end, a bottom end, and a sidewall, said sidewall having a side opening;
a busway fitting bus assembly coupled to said housing assembly having a plurality of elongated, main bus members and a support assembly;
said main bus members structured to extend the length between said busway fitting housing assembly bottom end and said busway fitting housing assembly top end;
a support assembly having an extruded body structured to enclose and support said plurality of elongated bus members, said main bus members extending beyond said extruded body in one direction;
a circuit breaker disposed in said housing assembly, said circuit breaker having at least one line terminal and at least one load terminal;
at least one tap bus extending between, and in electrical communication with, said circuit breaker line terminal and at least one of said main bus members; and
at least one load bus extending between said circuit breaker load terminal and said side opening.

14. The busway fitting of claim 13 wherein said extruded body is conductive.

15. The busway fitting of claim 14 wherein said support assembly includes a ground bus bracket, said ground bus bracket structured to be coupled to, and in electrical communication with, both said extruded body and said busway fitting housing assembly.

16. The busway fitting of claim 14 wherein said extruded body is made from aluminum.

17. The busway fitting of claim 13 wherein said plurality of main bus members includes three bus members.

18. The busway fitting of claim 13 wherein said at least one load bus includes a lateral extension portion structured to extend laterally across said busway fitting housing assembly, said lateral extension portion having a male end and a female end.

19. A busway comprising:
a first busway section;
a busway fitting having a housing assembly and a busway fitting bus assembly;
said housing assembly defining an enclosed space, said housing assembly having a top end, a bottom end, and a sidewall, said sidewall having a side opening;
said busway fitting bus assembly coupled to said housing assembly having a plurality of elongated, main bus members and a support assembly;
said main bus members structured to extend the length between said busway fitting housing assembly bottom end and said busway fitting housing assembly top end;
a support assembly having an extruded body structured to enclose and support said plurality of main bus members, said main bus members extending beyond said extruded body in one direction;
at least one tap bus extending between said side opening and at least one of said main bus members;
said first busway section coupled to, and in electrical communication with, said busway fitting bus assembly;
a second, busway section; and
said second busway section coupled to, and in electrical communication with, said busway fitting bus assembly.

20. The busway of claim 19 further comprising a meter center coupled to, and in electrical communication with, said busway fitting at least one tap bus.

* * * * *